Patented Dec. 13, 1938

2,139,766

UNITED STATES PATENT OFFICE 2,139,766

MINERAL OIL STABILIZING AGENT AND COMPOSITION CONTAINING SAME

Louis A. Mikeska and Charles A. Cohen, Elizabeth, N. J., assignors to Standard Oil Development Company, a corporation of Delaware No Drawing. Application November 27, 1935, Serial No. 51,827

6 Claims. (Cl. 87—9)

This invention relates to the stabilization of mineral oils. More specifically, it involves the addition of certain substituted aryl thio ethers to oils in order to produce compositions stable to air, heat, separation, sludging in presence of metals, and other deteriorating influences.

It is well known that many phenols and aromatic amines possess the property of retarding the oxidation of certain oils. The common impression exists that most, if not all such compounds will inhibit the oxidation of all oils, rubber, resins, etc. Recent systematic research on this subject, however, has shown that such a belief is without any reasonable grounds, since as many soluble compounds of the type given can be found to be ineffective or even detrimental in a particular oil, as there are compounds giving beneficial results.

In the case of lubricating oils, although it is generally desirable to employ an oil having a low oxidation rate, at ordinary temperatures, this is not the only important criterion to be considered. The oil must resist injurious oxidation at the high temperatures encountered in the engine as well. It must also be free of any tendency to settle out sludge or other solid matter in contact with metals (cone test), and must not cause ring sticking or gumming when employed in an engine. Naturally, any inhibitor must be soluble in the oil at the temperatures encountered in practice and not settle out even at −30 or −50° F. Other properties such as the lack of any detrimental effect upon demulsibility, color, color hold, Conradson carbon, corrosion, viscosity, Viscosity Index and gravity are also desirable.

Heretofore, few, if any, single stabilizing agents for lubricants possessed these properties. As a general rule most oxidation inhibitors seriously affect demulsibility, Conradson carbon and other important properties of lubricants. Attempts have been made by various investigators to employ mixtures of different inhibitors to eliminate this result, but apparently each compound possesses some detrimental property which cannot be overcome by the addition of an auxiliary compound. For instance, many organic compounds possess good inhibiting powers against oxygen absorption, but they form too great a deposit in the cone test (to be described later). Others possess good cone ratings but have little effect on the oxidation rate. If a mixture of both is employed, the cone rating is often worse, and furthermore, the Sligh value is generally increased considerably. Many compounds possess a good Sligh value, but cause exceptionally bad ring sticking in actual engine tests.

An object of this invention, therefore, is to prepare a stabilizing agent for lubricating oils which gives good oxidation inhibiting properties at engine temperature, a good cone rating, little if any ring sticking in engine tests, and substantially no effect upon other properties such as demulsibility, color, Conradson carbon, etc. A further object is to prepare stable lubricating oil blends containing such stabilizing agents.

Before continuing with the discussion, it would be helpful to include here a description of a number of tests developed in connection with the work or described in the literature, and to show their significance and relation to actual engine operation:

*Oxygen absorption test.*—This test is used for the most part in judging the oxidation susceptibility and acid formation of a lubricating oil at elevated temperatures. The results are generally given in the number of ccs. of oxygen absorbed by 10 cc. of an oil per 15 minute intervals at 200° C.

*Cone test.*—This method is a means for determining the tendency of an oil to deposit solid matter upon heated metallic surfaces. It consists in slowly dropping the oil to be tested over a heated metal (generally steel) cone, having a circumferential groove milled out in a screw fashion on the periphery so as to allow a time of contact of about one minute between the heated steel surface and the oil. A total volume of 60 cc. of oil is dropped from a dropping funnel during a period of 2 hours to obtain this time of contact. The temperature of the cone may be any desired value, but for lubricating oils 250° C. is preferable since it represents approximately the extreme temperature to which oils are exposed in ordinary engine use. The cone is weighed before the test. After all the oil is run over the metal surface, the cone is washed with naphtha to remove adhering oil and the total deposit left is obtained by difference in weight. This value is generally reported in grams. The test does not appear to have any relation to the oxygen absorption test, since it is possible to have two compounds giving the same cone deposit in lubricating oils, but having widely varying oxygen absorption rates, and vice versa.

*Ring sticking test.*—This test is often employed to indicate the susceptibility of a lubricating oil to stick rings and gum up pistons in an aviation engine. The oil is employed to lubricate a C. F. R. (Cooperative Fuel Research) engine with a jacket temperature of 390° F. using 2½ lbs. of oil for 14 hours, a very severe test for performance under hot conditions. The piston demerit is the rating given based on the general appearance of the pistons; the worse the condition, the higher the value. Usually, a record is also made of the number of rings stuck as well as the number of degrees of the stuck portion of the piston rings.

*Sligh test.*—The tendency of an oil to sludge under oxidizing conditions is described in Proc. A. S. T. M. 24, 964, II (1924).

*Demulsibility test.*—Generally employed for ascertaining the emulsifiability of turbine lubricating oils. It is described in Bur. Mines Circ. 323A and B and in Federal Specif. Stock Catalog, Section IV DV-L-791, October 3, 1933.

The compounds found to have all of the desirable properties described above may be classified according to the general formula:

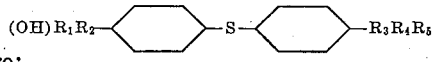

where:

$R_1$ and $R_4$ = Alkyl, aryl alkyl, aryl or H
$R_2$ and $R_5$ = Halogen, H, CN, or any other non-antioxidant group
$R_3$ = OH, H, Cl, or any other substituent group A preferred example of this class of compounds is the di-alkyl di-phenol thio ether as shown by the structure

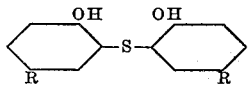

where R is an alkyl group such as ethyl, isopropyl, tertiary butyl, tertiary amyl, normal butyl, etc. in any position, but preferably in para position to the hydroxy group. The two R's may represent the same or different alkyl groups.

The above materials may be prepared in a number of ways. For example, the corresponding phenol may be heated with sulfur dichloride, driving off HCl according to the reaction:

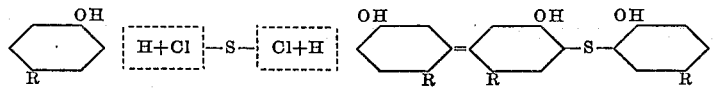

Or, it is possible to react a phenol or alkylated phenol with sulfur dichloride to give say, 4:4' dihydroxy di-phenyl thio ethers which may then be alkylated either by reacting with an olefine in presence of a condensing agent such as sulfuric acid, boron fluoride, aluminum chloride, etc., or with an alcohol or alkyl chloride and a condensing agent. Another method of preparation is to first produce 4—4' dihydroxy di-phenyl thioether by reacting phenol with sulfur chloride, and then prepare ethers by reaction in alkaline media with alkyl chlorides or dialkyl sulfates. These ethers, in turn, may then be isomerized in the presence of anhydrous aluminum chloride to produce dialkyl di-phenol thioethers as in the example:

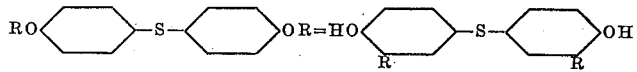

Superior stabilizing agents may be prepared from alkylated phenols obtained by condensation of phenol with the $C_4$ and/or $C_5$ fraction of cracked petroleum hydrocarbons, these being rich in secondary and tertiary olefines of 4 and/or 5 carbon atoms, the alkylated products being converted to the dialkyl thioethers by any of the above processes. The secondary olefines may be separated from the tertiary, and condensed separately to produce corresponding mixed di-secondary or di-tertiary thioethers.

The crude stabilizing agents formed by the above methods may be further purified by distillation, extraction, treating with clay, acid, etc.

Although the compounds prepared according to this invention have very little, if any, effect upon the oxidation of gasoline, they greatly stabilize mineral lubricating oils at elevated temperatures, especially the highly refined oils such as synthetic oils, solvent extracted oils obtained by treatment of mineral lubricating oils with single solvents such as phenol, dichlorethyl ether, furfural, propane, nitrobenzene, crotonaldehyde, etc., or by double or multiple solvents such as propane-cresol, etc., clay or acid treated oils, also aluminum chloride treated oils, white oils, hydrogenated oils, and the like, and to the greatest extent such oils having viscosity indices above 60, 80, 100 or more. Lubricating oils also stabilized by these compounds are other mineral oils of over 35 or 40 viscosity Saybolt at 210° F., and even those having a viscosity of over 100 seconds at 100° F., either in the crude form or partially or highly refined by distillation, voltolization, chemical reagents, and adsorptive agents, as well as coal tar or shale distillates, pale oils, neutrals, bright stocks and other residual stocks, cracking coil tar fractions, condensed or polymerized fractions, and the like, either waxy, dewaxed, or non-waxy.

The stabilizing agents prepared according to this invention are generally employed in proportions below 1%, say 0.5%, 0.2%, 0.1% or even 0.05% or less, although percentages up to 5% are often advantages in the case of highly unstable oils.

The lubricants to which these stabilizing agents are added may also contain dyes, metallic or other soaps, pour inhibitors, sludge dispersers, oxidation inhibitors, thickeners, V. I. improvers such as soluble linear polymers, oiliness agents, resins, rubber, fatty oils, heat thickened fatty oils, sulfurized fatty oils, extreme pressure lubricating agents, organo-metallic compounds, bright stocks (such as refined petroleum lubricating oil residues), voltolized fats, mineral oils and/or waxes, colloidal solids such as graphite, zinc oxide, etc., and the like.

The following examples illustrate many of the phases involved in this invention:

*Example 1*

About 327 grams of phenol are dissolved in carbon disulfide to make a total volume of 1 liter. The solution is placed in a 3-liter 3-nicked flask fitted with a dropping funnel, reflux condenser and stirrer. The flask is surrounded with an ice-salt freezing mixture and the stirrer is started.

Then 179 gms. of sulfur dichloride are dissolved in carbon disulfide to a total volume of 500 cc. and placed in the dropping funnel. The top of the funnel is connected with a bent tube to a rubber tube lying on the floor to prevent carbon disulfide vapors from reaching the motor. The top of the condenser is connected by means of tubing to a safety flask and the flask to a solution of caustic. The sulfur chloride solution is then allowed to run in at a very slow rate. Hydrogen chloride is immediately liberated and taken up in the absorber.

The resulting product crystallizes out from the carbon disulfide solution in fine granular crystals as soon as it is formed. The addition of sulfur dichloride generally takes about 1½ hours. After it is all added, the mixture is stirred until no more hydrogen chloride is liberated. 500 cc. of carbon disulfide are added and the whole mixture is filtered on a Buchner funnel. The product is dissolved in ether and washed free of acid, dried over sodium sulfate and recovered from the ether from the water bath.

The 4:4' dihydroxy diphenyl thioether having the formula

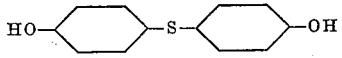

was added in 0.1% concentration to a blended lubricating oil containing a hydrogenated oil and bright stock. Cone tests were run on the blend and a blank, with the following results:

|  | Cone deposit | Reduction |
|---|---|---|
|  |  | Percent |
| Blank | 0.44 |  |
| Blank+0.1% thioether | 0.26 | 40.9 |

It will be noted that a sharp reduction (about 41%) in deposit on the metal cone at 250° C. was obtained when the stabilizer was present.

*Example 2*

A lubricating oil obtained by phenol extraction and having a Viscosity Index of 90 was blended with 0.2% ditertiary butyl diphenol thioether. Cone tests on the blend as well as the blank showed that the thioether stabilized the oil to an exceptional degree (almost 60% reduction in deposit) as can be seen from the data:

|  | Cone deposit | Reduction |
|---|---|---|
|  |  | Percent |
| Blank | 0.67 |  |
| Blend | 0.27 | 59.5 |

The blend also showed a marked decrease in oxygen absorption at 200° C., reducing the rate from 218 to 12–13—14–17 cc. O₂ per 15 min. intervals.

*Example 3*

An S. A. E. 50 refined lubricating oil was blended with 0.2% of di-cresol thio-ether. Approximately a 90% reduction in cone deposit was obtained, as is apparent from the data:

|  | Cone deposit | Reduction |
|---|---|---|
|  |  | Percent |
| Blank | 0.67 |  |
| Blend | 0.07 | 89.5 |

*Example 4*

A Pennsylvania oil of S. A. E 50 grade was likewise blended with 0.2% of di-β-naphthol thio-ether. A 33% reduction in cone deposit resulted:

|  | Cone deposit | Reduction |
|---|---|---|
|  |  | Percent |
| Blank | 0.57 |  |
| Blend | 0.38 | 33.3 |

*Example 5*

A petroleum lubricating oil had the following inspection characteristics:

Saybolt Viscosity @ 210° F._____ 90
Ring sticking test
    Piston demerit_____ 6.33
    Skirt demerit_____ 4.0
    No. rings stuck_____ 5
    Degrees_____ 1710

This oil was blended with 0.2% di-tertiary butyl diphenol thio-ether. The inspection characteristics of this blend were as follows:

Saybolt Viscosity @ 210° F._____ 90
Ring sticking test
    Piston demerit_____ 1.06
    Skirt demerit_____ 0
    No. rings stuck_____ 0
    Degrees_____ 0

The results show the effectiveness of di-tertiary butyl diphenol thio-ether in reducing ring sticking to practically a zero value.

*Example 6*

A sample of petroleum lubricating oil had the following properties:

A. P. I. gravity_____ 29.9.
Flash point_____ 465° F.
Fire point_____ 525° F.
Vis. Saybolt @ 100° F._____ 523.
Vis. Saybolt @ 210° F._____ 73.0.
Viscosity Index_____ 121.
Color_____ 12½ R.
Conradson carbon_____ 0.04%.
Corrosion at 210° F._____ Pass.
Demulsibility_____ 1620.
Oxidation rate @ 200° C._____ 183 cc.O₂/15 min./10 gm. oil In this oil was dissolved 0.1% of di-tertiary butyl diphenol thio-ether. Another series of tests was run on the blend, and the following data were obtained:

A. P. I. gravity_____ 29.9.
Flash point_____ 465° F.
Fire point_____ 525° F.
Vis. Saybolt @ 100° F._____ 523.
Vis. Saybolt @ 210° F._____ 73.0.
Viscosity Index_____ 121.
Color_____ 12½ R.
Conradson carbon_____ 0.04%.
Corrosion @ 210° F._____ Pass.
Demulsibility_____ 1620.
Oxidation rate @ 200° C._____ 44–28–26–26 cc. O₂/15 min./10 gm. oil.

It will be noted that the oxidation rate of the oil at 200° C. was lowered considerably without affecting in the least any of the other properties of the oil.

*Example 7*

A blend of 37% phenol treated oil in a neutral stock suitable as an aviation oil and having a viscosity at 210° F. of 118, showed the following results in the C. F. R. ring sticking test, with and without the addition of 0.2% di-tertiary butyl diphenol thio-ether:

|  | Overall demerit | | Degrees rings stuck | | Grams carbon in engine | | Varnish demerit | |
|---|---|---|---|---|---|---|---|---|
|  | 15 hrs. | 30 hrs. | 15 hrs. | 30 hrs. | 15 hrs. | 30 hrs. | 15 hrs. | 30 hrs. |
| Blank | 3.10 |  | 180 |  | 2.35 |  | 4 |  |
| Blend | 1.32 | 1.41 | 0 | 0 | 1.00 | 1.35 | 1 | 2 |

As the above data show, the addition of the thio-ether showed a great improvement in the appearance of the engine parts as expressed by the overall demerit rating. Also, no rings were stuck with the blend even after 30 hours operation, while in the case of the oil, 180° of the rings were stuck after 15 hours operation. Furthermore, the amount of carbon deposited in the engine was reduced to less than one-half, and the amount of varnish formed (as shown by the varnish demerit) was very little.

The alkyl phenol sulfides disclosed above are claimed as new compounds in our co-pending application Serial No. 224,540, filed August 12, 1938.

Although there have been shown and described certain specific embodiments of this invention, it is apparent that many modifications are possible. The invention, therefore, is not to be restricted except in so far as is necessitated by the prior art and by the spirit of the appended claims.

We claim:

1. A mineral lubricating oil containing a di-alkyl diphenol sulfide, containing an alkyl group of 4 to 5 carbon atoms, in an amount sufficient to increase the stability of the oil to oxidation, at temperatures of the order of 200° C.

2. A mineral lubricating oil having a tendency to deposit solid matter in the cone test described above, containing about 0.01 to 1% of a di-alkyl di-phenol sulfide in which the said two alkyl groups each have from 4 to 5 carbon atoms.

3. A mineral lubricating oil containing a di-alkyl di-phenol sulfide in which one of the alkyl groups has from 4 to 5 carbon atoms, and the other alkyl group has a different number of carbon atoms from the first group, in an amount sufficient to increase the stability of the oil to oxidation at temperatures of the order of 200° C.

4. Composition according to claim 1 in which the carbon atom in said alkyl group attached to the phenyl ring is attached to at least 2 other carbon atoms of the alkyl group.

5. Composition according to claim 1 in which said di-alkyl di-phenol sulfide is a tertiary amyl-phenol thio-ether.

6. Composition according to claim 1 in which said di-alkyl di-phenol sulfide is a tertiary butyl-phenol thio-ether.

LOUIS A. MIKESKA.
CHARLES A. COHEN.